(12) United States Patent
Kazuno et al.

(10) Patent No.: US 9,849,805 B2
(45) Date of Patent: Dec. 26, 2017

(54) FUEL CELL VEHICLE

(71) Applicant: HONDA MOTOR CO., LTD., Tokyo (JP)

(72) Inventors: Shuichi Kazuno, Wako (JP); Hibiki Saeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/169,741

(22) Filed: Jun. 1, 2016

(65) Prior Publication Data

US 2016/0375791 A1 Dec. 29, 2016

(30) Foreign Application Priority Data

Jun. 23, 2015 (JP) ................. 2015-125247

(51) Int. Cl.
*H02P 7/00* (2016.01)
*B60L 11/18* (2006.01)
*H01M 16/00* (2006.01)
*H01M 8/1018* (2016.01)

(52) U.S. Cl.
CPC ......... *B60L 11/1887* (2013.01); *B60L 11/18* (2013.01); *B60L 11/1851* (2013.01); *H01M 16/006* (2013.01); *H01M 2008/1095* (2013.01); *H01M 2250/20* (2013.01); *Y02T 90/32* (2013.01)

(58) Field of Classification Search
CPC ........................... H02J 2001/004; H02P 4/00
See application file for complete search history.

(56) References Cited

U.S. PATENT DOCUMENTS

2016/0288666 A1* 10/2016 Kim .................... B60L 11/1883

FOREIGN PATENT DOCUMENTS

JP 2013-027140 2/2013

\* cited by examiner

*Primary Examiner* — Karen Masih
(74) *Attorney, Agent, or Firm* — Mori & Ward, LLP

(57) ABSTRACT

A switch is to switch a connection mode between a serial mode and a parallel mode. In the serial mode, a fuel cell and a power storage device are connected in series and connected to a travelling apparatus in parallel. In the parallel mode, the fuel cell is connected to the travelling apparatus in parallel. A converter is to be turned on to boost a voltage generated by the fuel cell to be applied to the travelling apparatus and to be turned off when the parallel mode is selected. A controller is to control the switch to switch a connection mode to the parallel mode when power to be consumed by the travelling apparatus is lower than a first power threshold, and to switch the connection mode to the serial mode when the power to be consumed by the travelling apparatus is higher than the first power threshold.

21 Claims, 11 Drawing Sheets

FIG. 3

| STATE | | I | II | III | IV |
|---|---|---|---|---|---|
| SWITCHING ELEMENT | Pm [kW] | EXTREMELY LOW LOAD | LOW LOAD | MEDIUM LOAD | HIGH LOAD |
| | SW1 | OFF OR ON | ON | OFF | OFF |
| | SW2 | OFF | OFF | ON | ON |
| | SW3 | OFF | OFF | OFF | ON/OFF |
| | SW4 | OFF | OFF | OFF | |
| SERIAL/PARALLEL SWITCHING MODE | | OFF OR PARALLEL | PARALLEL | SERIAL | SERIAL |
| POWER SOURCE UNIT OPERATION STATUS | | IDLE REDUCTION (IS) | ONLY FC | FC AND BATTERY SERIALLY CONNECTED | FC AND BATTERY SERIALLY CONNECTED AND FC VOLTAGE BOOSTED |

FUEL CELL VEHICLE

CROSS-REFERENCE TO RELATED APPLICATIONS

The present application claims priority under 35 U.S.C. §119 to Japanese Patent Application No. 2015-125247, filed Jun. 23, 2015, entitled "Fuel Cell Vehicle." The contents of this application are incorporated herein by reference in their entirety.

BACKGROUND

1. Field

The present disclosure relates to a fuel cell vehicle.

2. Description of the Related Art

Japanese Unexamined Patent Application Publication No. 2013-27140 discloses an electric vehicle configured to drive a motor that generates motive power for traction with a power source unit including a converter connected in parallel to a fuel cell and a power storage device serially connected to each other, as illustrated in FIG. 1 in Japanese Unexamined Patent Application Publication No. 2013-27140.

The electric vehicle according to Japanese Unexamined Patent Application Publication No. 2013-27140 is configured to, as described in paragraphs [0046] and [0047], either boost a voltage of the fuel cell and/or the power storage device with the converter and apply the boosted voltage to the motor, or apply a serial voltage of the fuel cell and the power storage device to the motor, with the converter turned off.

SUMMARY

According to one aspect of the present invention, a fuel cell vehicle includes a motor load including a motor that generates motive power for traction, a fuel cell, and a power storage device. The fuel cell vehicle includes a serial/parallel switcher that switches a connection mode of the fuel cell and the power storage device with respect to the motor load between a serial mode and a parallel mode with the fuel cell alone, a converter to be turned off when either the serial mode or the parallel mode is selected, or to be caused to boost a fuel cell voltage when the serial mode is selected and to apply the boosted voltage to the motor load, and a control unit that controls the serial/parallel switcher and the converter. The control unit causes the serial/parallel switcher to select the parallel mode when the motor load is lower than a first power threshold equal to or lower than a supply capacity of the fuel cell, and to select the serial mode when the motor load is higher than the first power threshold.

According to another aspect of the present disclosure, a fuel cell vehicle includes a traveling apparatus, a fuel cell, a power storage device, a switch, a converter, and a controller. The traveling apparatus includes a motor to generate power to move the fuel cell vehicle. The switch is to switch a connection mode between a serial mode and a parallel mode. In the serial mode, the fuel cell and the power storage device are connected in series and connected to the travelling apparatus in parallel. In the parallel mode, the fuel cell is connected to the travelling apparatus in parallel. The converter is connected to the travelling apparatus in parallel to be turned on to boost a voltage generated by the fuel cell to be applied to the travelling apparatus and to be turned off not to boost the voltage generated by the fuel cell to be applied to the travelling apparatus when the parallel mode is selected. The controller is to turn on or turn off the converter. The controller is to control the switch to switch the connection mode to the parallel mode when power to be consumed by the travelling apparatus is lower than a first power threshold which is equal to or lower than a supply capacity of the fuel cell, and to switch the connection mode to the serial mode when the power to be consumed by the travelling apparatus is higher than the first power threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is a schematic diagram, with a part omitted, showing the configuration of the fuel cell vehicle with a main power switch turned ON.

FIG. 3 is a graph for explaining a connection mode/operation status of a power source unit corresponding to different motor loads.

DESCRIPTION OF THE EMBODIMENTS

Figure 1:
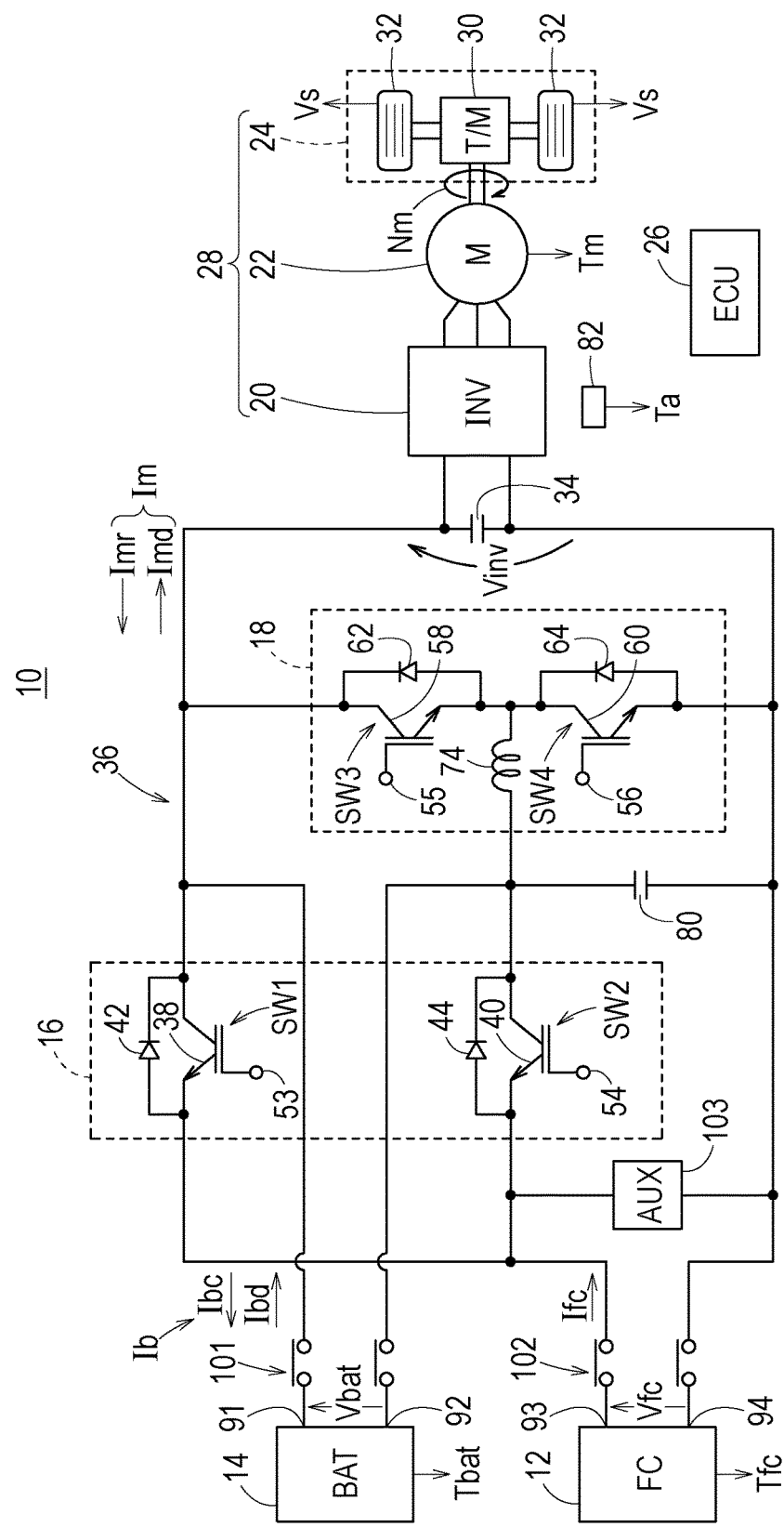
FIG. 1 is a schematic diagram showing an overall configuration of a fuel cell vehicle according to an embodiment of the present disclosure.

The embodiments will now be described with reference to the accompanying drawings, wherein like reference numerals designate corresponding or identical elements throughout the various drawings.

Hereafter, a fuel cell vehicle according to an embodiment of the present disclosure will be described with reference to the drawings.

FIG. 1 is a schematic diagram showing an overall configuration of a fuel cell vehicle 10 according to the embodiment.

As shown in FIG. 1, the fuel cell vehicle 10 according to this embodiment essentially includes a fuel cell (hereinafter abbreviated as FC) 12, a power storage device (hereinafter, BAT or battery) 14, a serial/parallel switcher (a switch) 16, a converter 18, an inverter (INV) 20, a motor (M) 22, a power transmission unit 24, and an electronic control unit (a controller, hereinafter abbreviated as ECU) 26.

An end of a battery contactor 101 is connected to the battery 14, and an end of a FC contactor 102 is connected to the FC 12. The other end of the FC contactor 102 is connected to an auxiliary device (AUX) 103 such as an air pump.

The battery contactor 101 and the FC contactor 102 are switched between an ON-state (closed state: one end and the other end are connected) and an OFF-state (open state: one end and the other end are disconnected), in accordance with an ON or OFF state of a non-illustrated main power switch (corresponding to an ignition switch of an internal combustion engine vehicle).

Hereafter, the fuel cell vehicle 10 will be described on the assumption that the main power switch is in the ON-state (closed), so that the battery contactor 101 and the FC contactor 102 are both in the ON-state (closed), unless otherwise noted.

The inverter 20, the motor 22, and the power transmission unit 24 in the fuel cell vehicle 10 constitute a motor load 28 (a travelling apparatus), and the power consumed by the motor load 28 will be referred to with a different reference code as motor load (power required by the motor) Pm [kW]. In addition, the FC 12, the battery 14, the serial/parallel switcher 16, and the converter 18 constitute a power source unit (DC power source unit) 36.

The power transmission unit 24 includes a transmission 30 and wheels 32, and transmits motive power generated by the motor 22 to the wheels 32 to thereby drive the fuel cell vehicle 10.

The inverter 20 is a bidirectional DC/AC converter, and serves as motor driving unit. The inverter 20 converts a source voltage Vinv, which is a DC voltage generated by the FC 12 and/or battery 14 at an output terminal of the power source unit 36, to a three-phase AC voltage when the motor 22 is in power running operation, and applies the AC voltage to the motor 22.

The inverter 20 also converts an AC regenerative voltage generated at both ends of the motor 22 at the time of deceleration (regeneration) of the motor 22 to a DC source voltage Vinv, to thereby charge the battery 14.

In addition, a capacitor 34 that smooths the source voltage Vinv is connected between a cathode terminal 91 of the power source unit 36 (also referred to as cathode terminal 91 of the battery 14) and an anode terminal 94 of the power source unit 36 (also referred to as anode terminal 94 of the FC 12).

FC 12, which is a solid polymer electrolyte fuel cell for example, includes stacked generating cells, each including a membrane and electrode assembly (MEA), composed of an electrolyte membrane with an anode electrode and a cathode electrode provided on the respective ends, the MEA being held between a pair of separators. In the FC 12, when hydrogen gas from a non-illustrated hydrogen tank and air from a non-illustrated air pump are respectively supplied to the anode electrode and the cathode electrode, a DC voltage (also referred to as FC voltage) Vfc is generated through electrochemical reaction, and the FC 12 outputs a direct current (also referred to as FC current) Ifc.

The battery 14 is an energy storage including a plurality of battery cells, and a secondary battery such as a lithium ion secondary battery or a nickel-hydrogen secondary battery may be employed. A capacitor may also be employed as the battery 14. In this embodiment, the lithium ion secondary battery is employed.

The battery 14 generates a DC voltage (also referred to as battery voltage) Vbat and discharges a direct current (also referred to as discharge current) Ibc. The battery 14 can also be charged with a direct current (also referred to as charge current) Ibd. The discharge current Ibc and/or the charge current Ibd will be collectively referred to as battery current Ibat.

The serial/parallel switcher 16 includes two switching elements SW1, SW2 arranged in parallel, respectively including a diode 42, 44 reversely connected to a transistor 38, 40. An end of each of the switching elements SW1, SW2 is connected in common to the cathode terminal 93 of the FC 12, and the other ends of the switching elements SW1, SW2 are respectively connected to the cathode terminal 91 and the anode terminal 92 of the battery 14. Control terminals 53, 54 for switching the switching element SW1, SW2 are connected to the ECU 26 via a non-illustrated connection line.

The converter 18 is a chopper type boost DC/DC converter, and includes a switching element SW3 on the high side and a switching element SW4 on the low side, respectively including a diode 62, 64 reversely connected to a transistor 58, 60. The low side of the switching element SW3 and the high side of the switching element SW4 are connected in common to an end of a reactor 74.

The high side of the switching element SW3 is connected to the cathode terminal 91 of the battery 14, and the low side of the switching element SW4 is connected to the anode terminal 94 of the FC 12.

Control terminals 55, 56 for switching the switching element SW3, SW4 are connected to the ECU 26 via a non-illustrated connection line.

The other end of the reactor 74 is connected to the anode terminal 92 of the battery 14, and a capacitor 80 for smoothing is connected between the anode terminal 92 of the battery 14 and the anode terminal 94 of the FC 12.

The ECU 26 is a processor including a microcomputer, and includes a central processing unit (CPU), a read-only memory (ROM, an EEPROM inclusive), a random-access memory (RAM), input/output devices such as an A/D converter and a D/A converter, and a timer serving as time keeping unit. The ECU 26 acts as various functional units, for example a control unit, a calculation unit, and a processing unit, when the CPU reads out a program stored in the ROM and executes the program. The ECU 26 may be constituted of a plurality of ECUs, instead of a single ECU. The ECU 26 may be substituted with a plurality of devices including the input/output devices, a comparator, and a waveform generator.

The ECU 26 controls the power generation of the FC 12, the charging and discharging power of the battery 14, the switching operation of the serial/parallel switcher 16, the boosting and turning off of the converter 18, and the power running and regenerative operation of the inverter 20, on the basis of a load (load power; limited to the motor load Pm in this embodiment for the sake of clarity) required from the power source unit 36 for the fuel cell vehicle 10 as a whole. Such load is determined on the basis of inputs from switches and sensors such as an outside temperature sensor 82, and an accelerator pedal sensor, a vehicle speed sensor, and a brake pedal sensor which are not shown, in addition to the state of the FC 12, the state of the battery 14, and the state of the motor load 28 including the motor 22.

In other words, the ECU 26 performs energy management control with respect to the entirety of the power source unit 36 inclusive of the FC 12 and the battery 14.

Here, the state of the FC 12 refers to a FC temperature Tfc, the FC current Ifc, the FC voltage Vfc, and generated power Pfc (Pfc=Ifc×Vfc), and the state of the battery 14 refers to a battery temperature Tbat, the battery voltage Vbat, the battery current Ibat (discharge current Ibd and charge current Ibc), and the state of charge (SOC) indicating the storage amount (remaining capacity) of the battery 14 (hereinafter, storage SOC). The mentioned states are constantly monitored and managed by the ECU 26.

The state of the motor load 28 refers to the temperature of the motor 22 (motor temperature Tm), a motor current Im (power running current Imd and regenerative current Imr), and a motor rotation speed Nm [rpm], which are also constantly monitored and managed by the ECU 26.

Further, the ECU 26 constantly monitors the wheel speed as vehicle speed Vs, in this embodiment. In addition, the outside temperature Ta is constantly detected by the outside temperature sensor 82.

The fuel cell vehicle 10 according to this embodiment is basically configured as described above.

Hereunder, the control operation of the ECU 26 with respect to the fuel cell vehicle 10 will be described, in terms of the following aspects (1), (2), and (3).

(1) Correspondence between the motor load Pm (state of the load) and the connection mode of the power source unit 36

Figure 2:
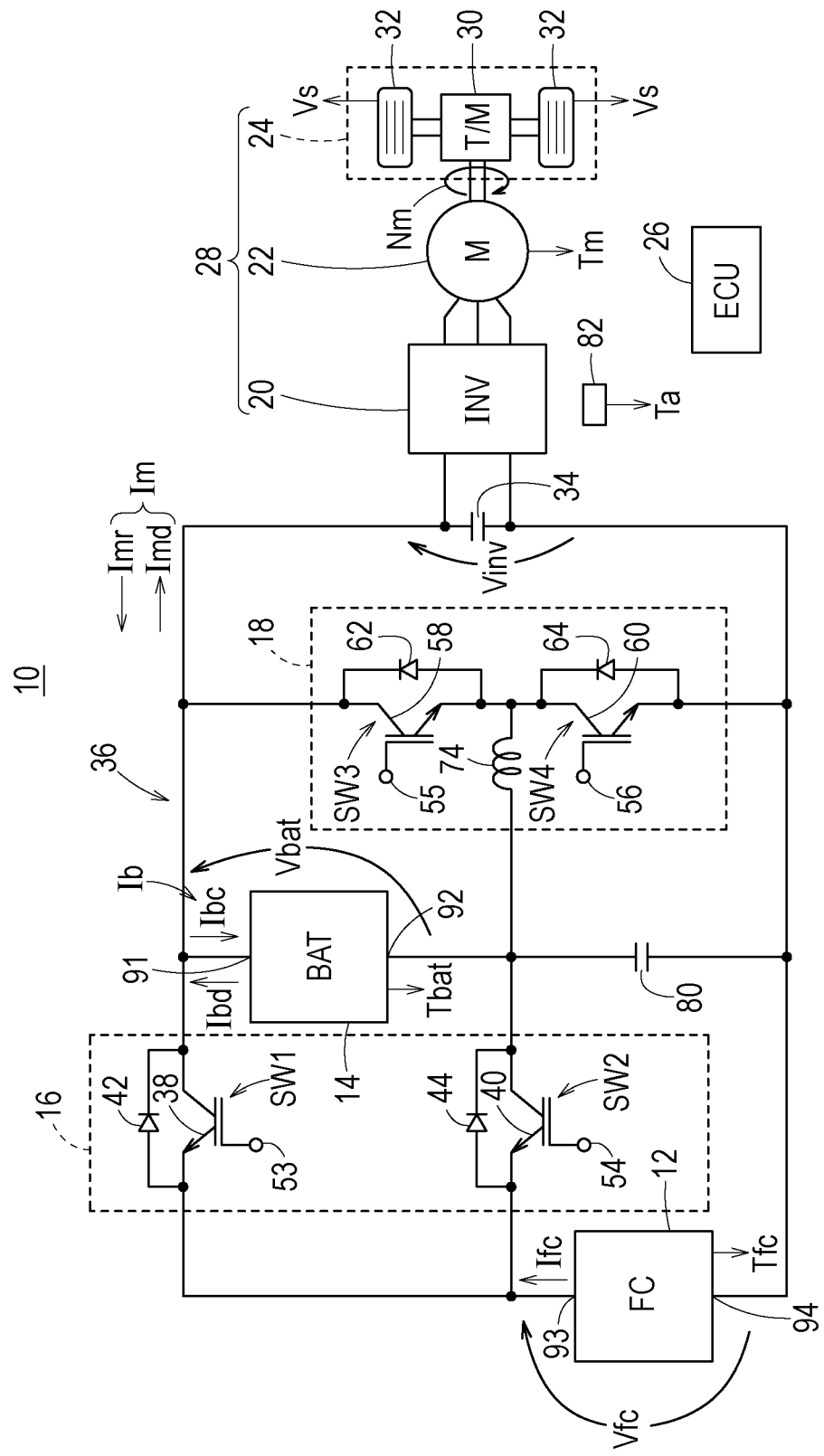

(2) Switching loss of the switching elements SW1 to SW4 in each state of the load condition (3) Description of the operation based on a flowchart FIG. 2 is a schematic diagram for describing the operation, showing the overall configuration of the fuel cell vehicle 10, from which the battery contactor 101, the FC contactor 102, and the auxiliary device 103, closed because the main power switch is closed, are excluded for the sake of clarity.

(1) Correspondence Between Motor Load Pm (State of Load) and Connection Mode of Power Source Unit 36

FIG. 3 is a graph for explaining the connection mode/operation status of the power source unit 36 (the connection mode of the serial/parallel switcher 16 and the operation status of the converter 18) corresponding to states I to IV of the motor load Pm.

More specifically, FIG. 3 shows the correspondence between the motor load Pm [kW] and the connection mode of the power source unit 36 (ON/OFF-state and serial/parallel selection of the switching element SW1 to SW4), and the correspondence between the motor load Pm and the operation status of the power source unit 36.

The state I represents an extremely low load state of the power source unit 36, corresponding to an idle reduction (IS) phase, for example when the fuel cell vehicle 10 stops at a traffic light. In the extremely low load the motor load Pm is zero (Pm=0), and the auxiliary device 103, for example the air pump, is in the low load state and driven by the power from the FC 12. In actual use, the supply of hydrogen and air is reduced in the idle reduction phase of the fuel cell vehicle 10, compared with a driving phase. Accordingly, the load of the FC 12 is limited to driving the auxiliary device 103 (see FIG. 1) such as the air pump that supplies air.

Figure 4:
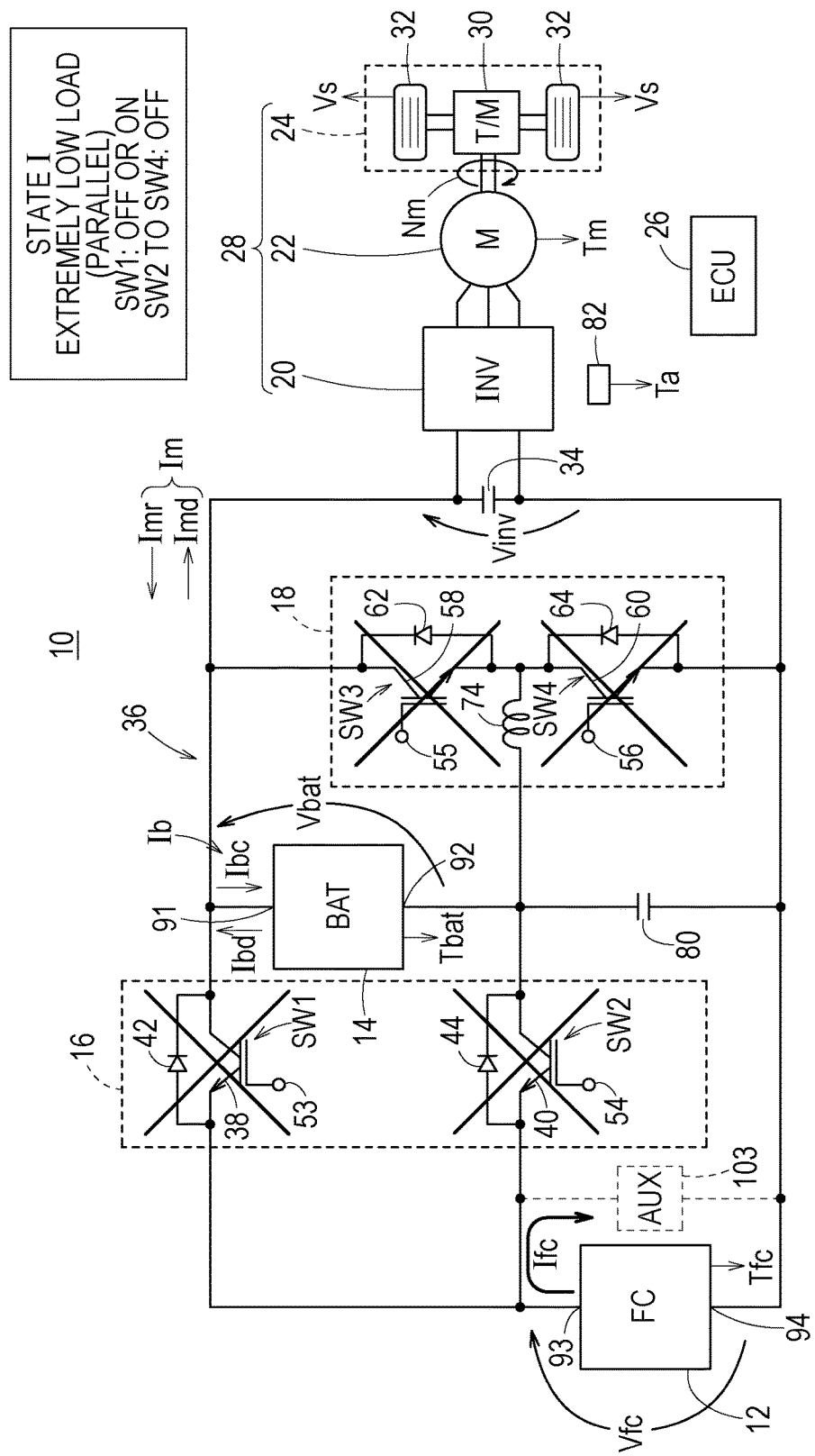
FIG. 4 is a schematic diagram for explaining the connection mode/operation status of the power source unit corresponding to an extremely low load.

In the extremely low load state (state I), the switching element SW1 is turned OFF or ON (in FIG. 4, OFF) and the switching elements SW2 to SW4 are turned OFF as shown in FIG. 4, and the serial/parallel switcher 16 is set to an OFF-state or a parallel mode.

In the extremely low load state (state I), the FC 12 supplies power only to the auxiliary device 103 (see FIG. 1), and no power is supplied to the motor load 28 from the FC 12 and the battery 14. In this case, the ECU 26 sets all the switching elements constituting the inverter 20 of the motor load 28 to the OFF-state (duty=0). In FIG. 4, the constituents with a cross mark are set to the OFF-state, which also applies to FIG. 5 to FIG. 7 to be subsequently referred to.

The state II in FIG. 3 represents a low load state of the motor load 28, in which the switching element SW1 is turned ON, and the switching element SW2 to SW4 are turned OFF, and the serial/parallel switcher 16 is set to the parallel mode.

Figure 5:
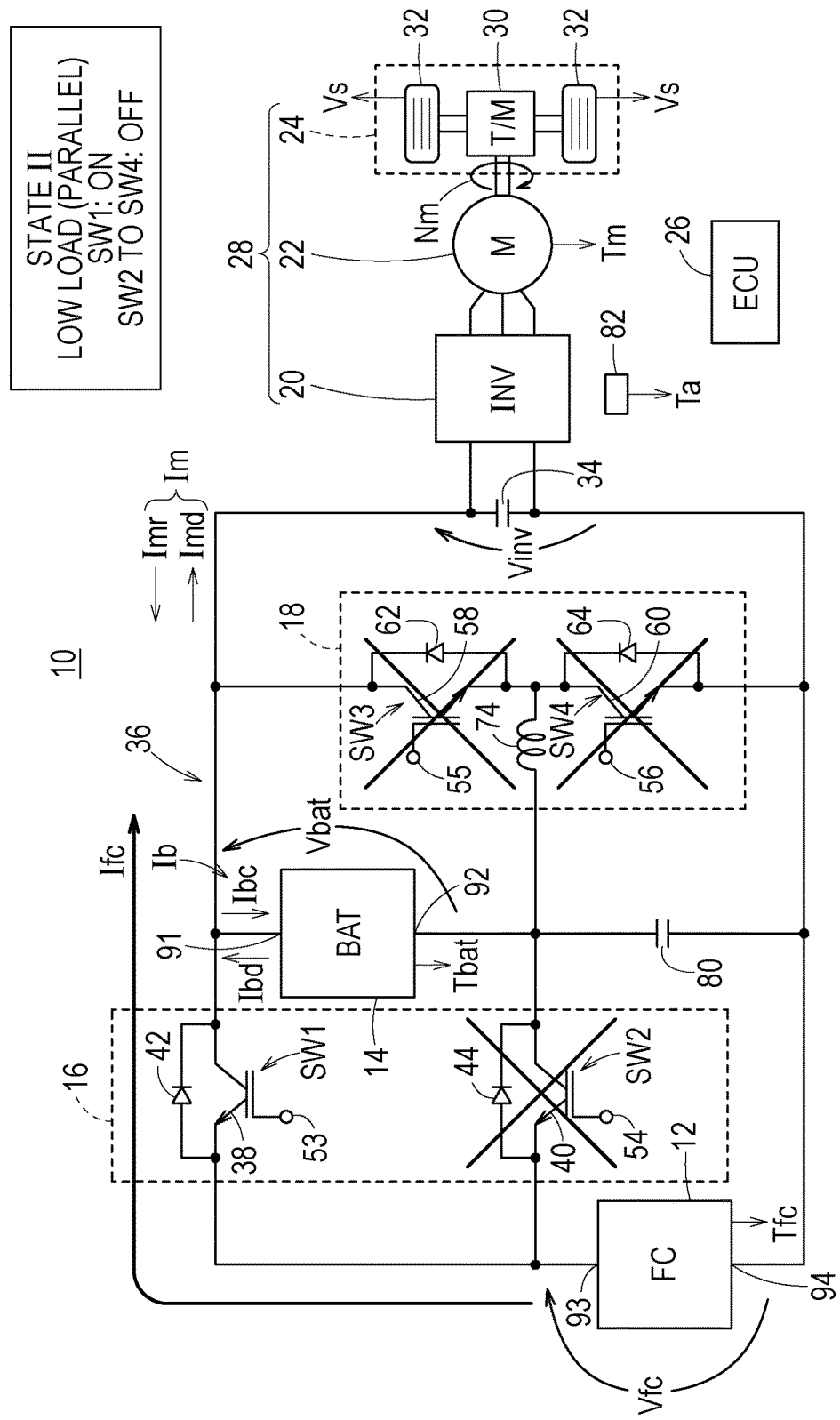
FIG. 5 is a schematic diagram for explaining the connection mode/operation status of the power source unit corresponding to a low load.

In the low load state of the motor load 28 (state II), the motor load (power required by motor) Pm is covered exclusively by the power of the FC 12, as shown in FIG. 5. More specifically, with respect to the motor load 28, only the FC voltage Vfc from the FC 12 is applied as source voltage Vinv to the input terminal (load input terminal) of the inverter 20 (Vinv=Vfc), and the FC current Ifc is supplied as power running current Imd to the motor load 28, through the diode 42 in the switching element SW1.

Here, during the transition from the stopped state corresponding to the state I shown in FIG. 4 to the starting state in which a non-illustrated accelerator pedal is operated, corresponding to the state II shown in FIG. 5, the inverter 20 is turned on under a condition where the battery voltage Vbat is higher than the FC voltage Vfc (Vbat>Vfc) (duty>0). As result, the motor load (power required by motor) Pm can be immediately supplied to the motor load 28 from the battery 14, so that the fuel cell vehicle 10 can smoothly start. The current flow in this case is as follows. The discharge current Ibd flowing out of the cathode terminal 91 of the battery 14 constitutes the power running current Imd for the motor 22, which is supplied to the motor load 28, and the return current from the motor load 28 returns to the anode terminal 92 of the battery 14 through the diode 64. Then upon proceeding to the state II (FIG. 5) from the state I (FIG. 4) with such current flow, more powerful and smooth startup and acceleration can be attained during the transition phase.

The state III shown in FIG. 3 represents a medium load state of the motor load Pm (motor load 28), in which the switching element SW1 is turned OFF, the switching element SW2 is turned ON, and the switching elements SW3, SW4 are turned OFF, and the serial/parallel switcher 16 is set to a serial mode.

Figure 6:
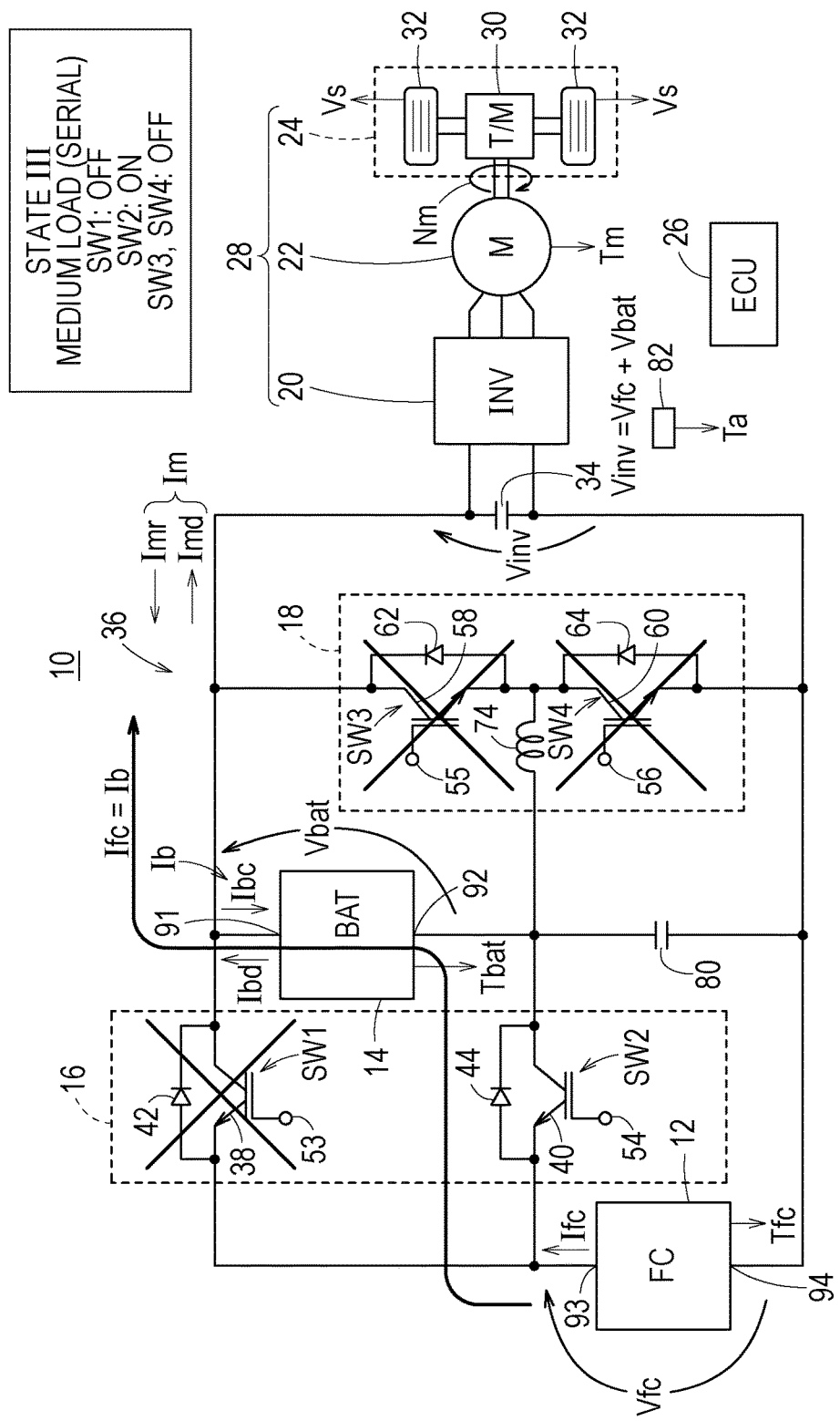
FIG. 6 is a schematic diagram for explaining the connection mode/operation status of the power source unit corresponding to a medium load.

In the medium load state (state III) of the motor load 28, the motor load (power required by motor) Pm is covered by a combined power of the FC 12 and the battery 14 serially connected to each other, as shown in FIG. 6. More specifically, with respect to the motor load 28 a serial voltage Vfc+Vbat composed of the FC voltage Vfc and the battery voltage Vbat is applied as source voltage Vinv to the input terminal (load input terminal) of the inverter 20 (Vinv=Vfc+Vbat), and the FC current Ifc flowing out of the cathode terminal 93 of the FC 12 constitutes the battery current Ibat upon passing through the battery 14 (Ifc=Ibat). The battery current Ibat flows into the motor load 28 as motor current Im (Im=Ibat), and the return current returns to the anode terminal 94 of the FC 12 as FC current Ifc.

The state IV shown in FIG. 3 represents a high load state of the motor load Pm (motor load 28), in which the switching element SW1 is turned OFF, the switching element SW2 is turned ON, and the switching elements SW3, SW4 are turned ON and OFF (expressed as ON/OFF), and the serial/parallel switcher 16 is set to the serial mode.

Figure 7:
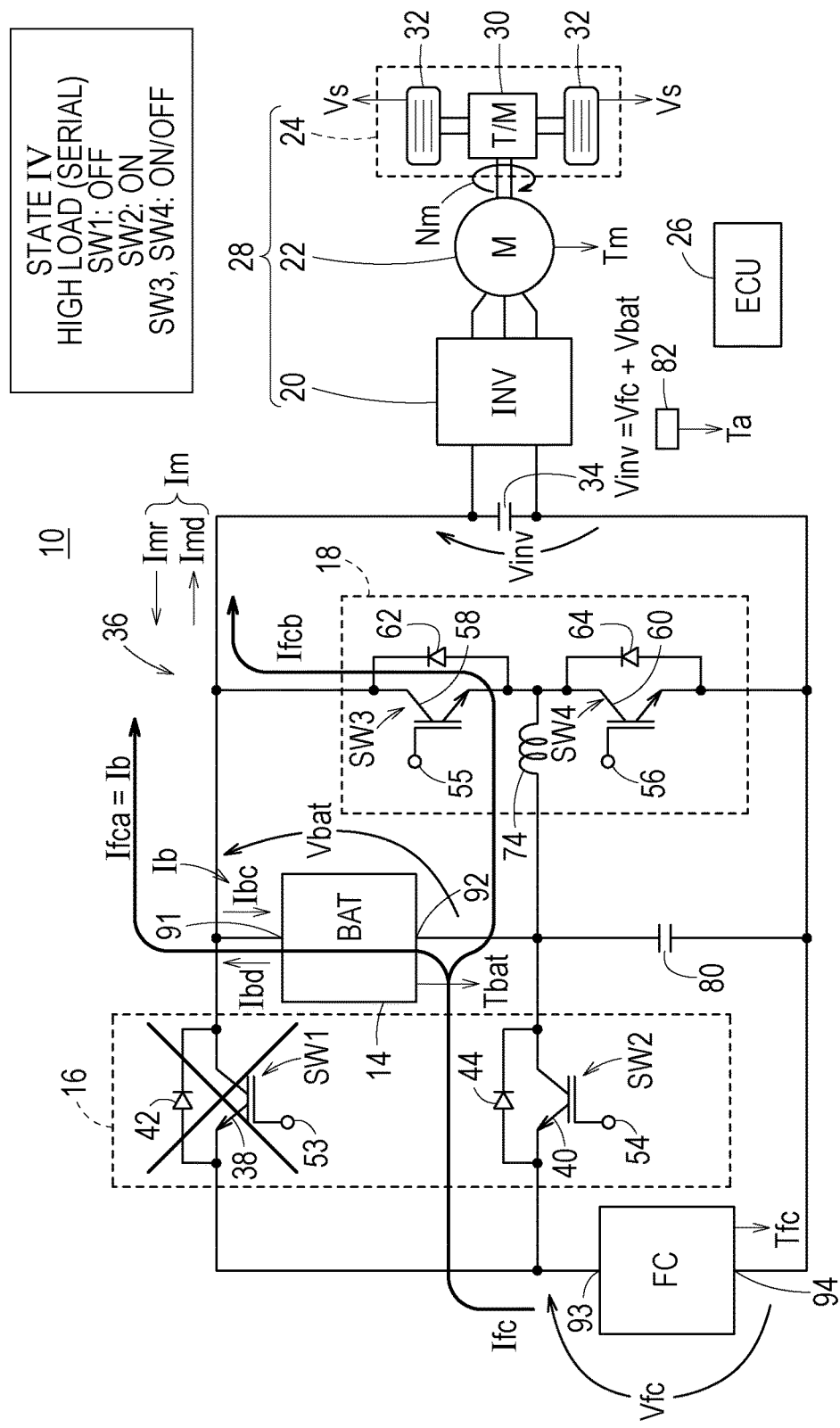
FIG. 7 is a schematic diagram for explaining the connection mode/operation status of the power source unit corresponding to a high load.

In the high load state (state IV) of the motor load 28, the ECU 26 causes the converter 18 boost the FC voltage Vfc to the serial voltage Vfc+Vbat, so as to cover the motor load (power required by motor) Pm, as shown in FIG. 7, by a combined power composed of the power of the FC 12 and battery 14 serially connected to each other and the power from the FC 12 boosted by the converter 18 from the FC voltage Vfc to the serial voltage Vfc+Vbat.

In other words, the FC current Ifc from the FC 12 is added to the FC current Ifca flowing through the battery 14 (Ifca=Ibat), to thereby increase up to the FC current Ifcb flowing through the converter 18 (Ifc=Ifca+Ifcb).

More specifically, with respect to the motor load 28, the serial voltage Vfc+Vbat composed of the FC voltage Vfc and the battery voltage Vbat is applied as source voltage Vinv to the input terminal of the inverter 20 (load input terminal), and the motor load 28 is driven by the current higher than the current of the state III.

(2) Switching Loss Lsw (Lsw1 to Lsw4) of Switching Elements SW1 to SW4 in Each State of Load Condition (I to IV)

Figure 8:
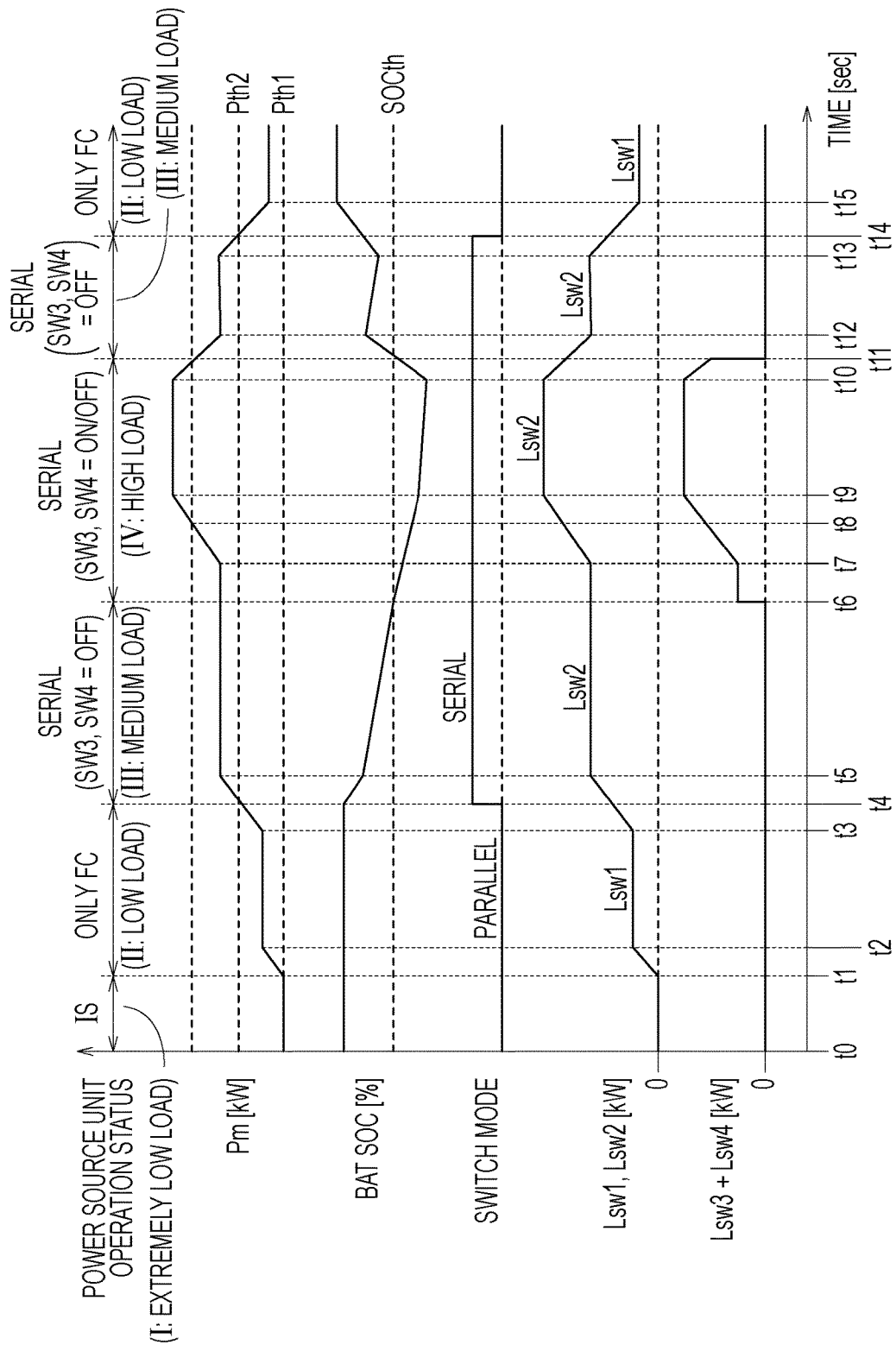
FIG. 8 is a time chart for explaining an operation of the fuel cell vehicle according to the embodiment.

FIG. 8 is a time chart for explaining the operation of the fuel cell vehicle 10, representing driving conditions including a stop at a traffic light.

Referring to the time chart, the switching loss Lsw [kW] of the switching elements SW1 to SW4 in each of the aforementioned operation status of the power source unit 36 will be described hereunder, in combination with further details of the operation of the power source unit 36. The first switching loss Lsw of the switching elements SW1 to SW4 will be respectively denoted by switching loss Lsw1 [kW], Lsw2 [kW], Lsw3 [kW], and Lsw4 [kW]. In this embodiment, it will be assumed that the lower the switching loss Lsw is, the higher system efficiency of the fuel cell vehicle 10 can be attained.

To start with, between a time point t0 and a time point t1 the motor load (power required by motor) Pm is in the extremely low load state (state I), for example the idle reduction (IS) phase, in which the switching element SW1 to SW4 can all be turned OFF as shown in FIG. 3, and therefore the switching losses Lsw1 to Lsw4 are all zero (0=Lsw1=Lsw2=Lsw3=Lsw4).

Between the time point t1 and a time point t4, the motor load (power required by motor) Pm is in the low load state (state II), for example a stable cruising phase, in which only the switching element SW1 is in the ON-state and all others are in the OFF-state as described referring to FIG. 5, and therefore only the switching element SW1 suffers the switching loss Lsw1. The switching loss Lsw1 generated in this case is substantially a forward power loss of the diode 42, which is relatively small.

Between the time point t4 and a time point t6, the motor load (power required by motor) Pm is in the medium load state (state III), for example a moderate acceleration phase, in which, as described referring to FIG. 6, the switching element SW1 which has been in the ON-state is turned OFF, and instead the switching element SW2 is turned ON. In the medium load state (state III), the switching loss Lsw2 of the switching element SW2 (substantially a forward power loss of the diode 44) is increased, in proportion to the increase in motor current Im compared with the low load state (state II).

Between the time point t6 and a time point t11, the motor load (power required by motor) Pm is in the high load state (state IV), for example on an uphill of a highway where a large motive power has to be outputted, in which, as described referring to FIG. 7, the converter 18 is caused to boost, and the switching losses Lsw2, Lsw3, Lsw4 of the respective switching elements SW2, SW3, SW4 are increased, the higher the motor load Pm becomes.

Between the time point t11 and a time point t14 the motor load Pm is in the medium load state (state III), and the period subsequent to the time point t14 the motor load Pm is in the low load state (state II), both of which are as described above.

(3) Description of Operation Based on Flowchart

Figure 9:
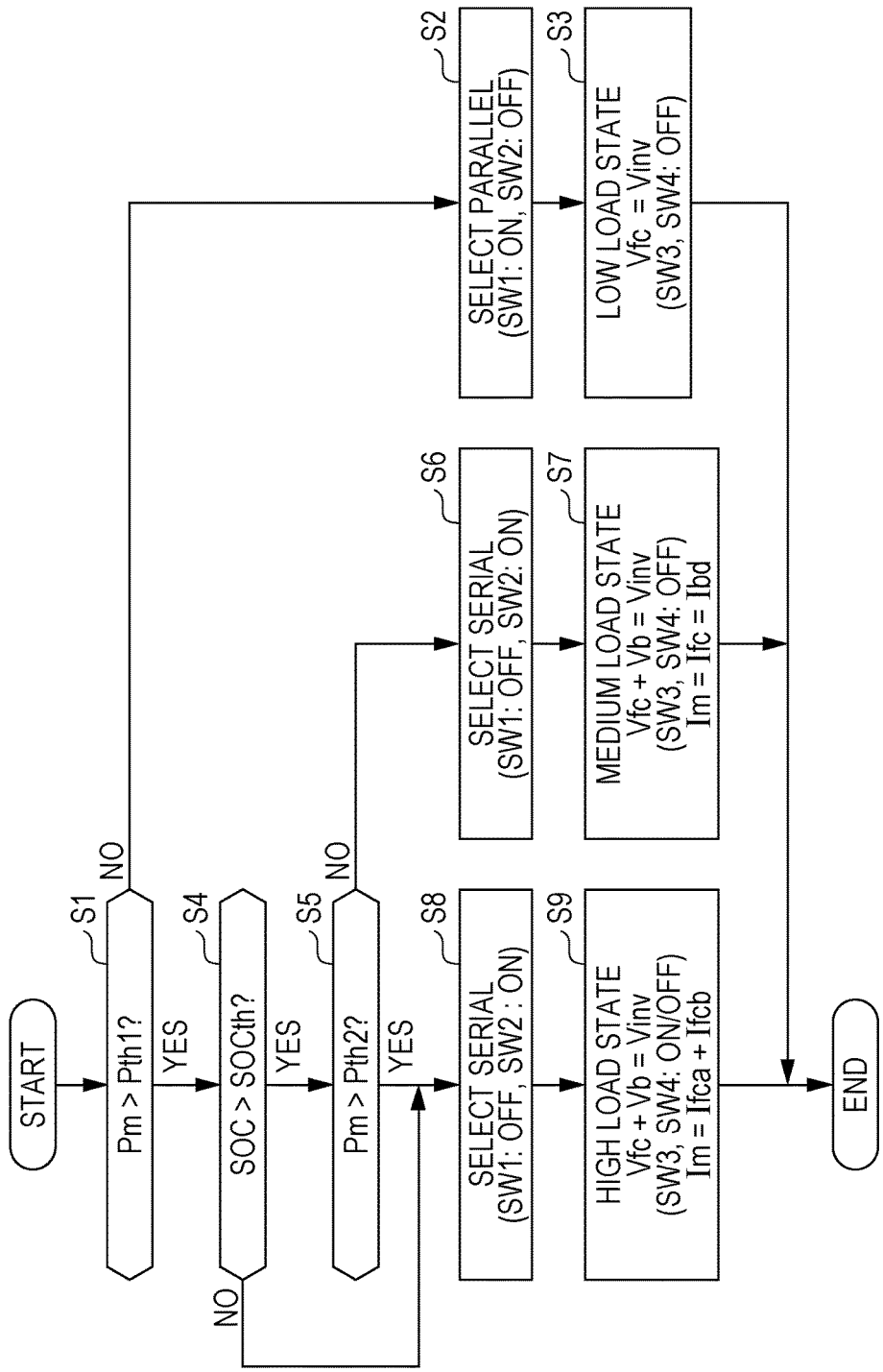
FIG. 9 is a flowchart for explaining the operation of the fuel cell vehicle according to the embodiment.

FIG. 9 is a flowchart for explaining the control operation of the ECU 26. The process listed in the flowchart is primarily executed by (the CPU of) the ECU 26. In the description given below, the time chart of FIG. 8 may also be referred to, for the sake of clarity.

At step S1, the ECU 26 decides whether a detected motor load (power required by motor) Pm is higher than a first power threshold Pth1 (see FIG. 8), while the fuel cell vehicle 10 is running. Here, the first power threshold Pth1 is set to a value in the vicinity of the boundary between the low load state (state II) and the medium load state (state III).

When the motor load Pm is lower than the first power threshold Pth1 (Pm≤Pth1) (NO at step S1), the ECU 26 decides at step S2 that the load is low (state II), and set the switching element SW1 to the ON-state, the switching elements SW2 to SW4 to the OFF-state, and the serial/parallel switcher 16 to the parallel mode.

Then the ECU 26 controls the FC 12 according to the motor load Pm (Vfc=Vinv) in the low load state (state II), at step S3.

In contrast, when the motor load Pm is higher than the first power threshold Pth1 (Pm>Pth1) (YES at step S1), the ECU 26 further decides whether the storage SOC, corresponding to the remaining capacity of the battery 14, is larger than a storage threshold SOCth (see FIG. 8), at step S4. Here, storage threshold SOCth is provided for distinguishing whether the storage SOC is sufficient for continuously supplying the power required for the motor load Pm, and is set to a predetermined value between, for example, 40[%] and 60[%].

When the storage SOC is larger than the storage threshold SOCth (SOC>SOCth) (YES at step S4), the ECU 26 further decides whether the motor load Pm is higher than a second power threshold Pth2 larger than the first power threshold Pth1 (see FIG. 8, Pth2>Pth1), at step S5. Here, the second power threshold Pth2 is set to a value in the vicinity of the boundary between the medium load state (state III) and the high load state (state IV).

When the motor load Pm is lower than the second power threshold Pth2 (Pth1<Pm<Pth2) (NO at step S5), the ECU 26 decides at step S6 that the load is in the medium state (state III), and also sets the switching element SW1 to the OFF-state, the switching element SW2 to the ON-state, and the serial/parallel switcher 16 to the serial mode, at step S6.

At step S7, the ECU 26 turns OFF the switching elements SW3, SW4 (turns off the converter 18), and controls (the FC current Ifc of) the FC 12 according to the motor load Pm, in the medium load state (state III).

In contrast, when the motor load Pm is higher than the second power threshold Pth2 (Pm>Pth2) as result of the decision at step S5 (YES at step S5), the ECU 26 sets the serial/parallel switcher 16 to the serial mode at step S8, and turns on the converter 18 at step S9 by setting the switching elements SW3, SW4 to the ON/OFF state for boosting, and controls (the FC current Ifc of) the FC 12 according to the motor load Pm, in high load state (state IV).

When the storage SOC is smaller than the storage threshold SOCth (SOC≤SOCth) as result of the decision at step S4 (NO at step S4), the ECU 26 skips the decision of step S5, and proceeds to the operation of step S8 and step S9, irrespective of whether the motor load Pm is higher than the second power threshold Pth2.

Conclusion of Embodiment and Variations

As described thus far, the fuel cell vehicle 10 according to the embodiment includes the motor load 28 including the motor 22 that generates the motive power for traction, the FC 12, the battery 14, the serial/parallel switcher 16, the converter 18, and the ECU 26.

The serial/parallel switcher 16 switches the connection mode of the FC 12 and the battery 14 with respect to the motor load 28 between the serial mode and the parallel mode of the FC 12 alone.

The converter 18 is turned off when either the serial mode or the parallel mode is selected, or caused to boost the FC voltage Vfc when the serial mode is selected and to apply the boosted voltage (Vfc+Vbat) to the motor load 28.

The ECU 26 causes the serial/parallel switcher 16 to select the parallel mode (switching element SW1: OFF or ON, switching element SW2: OFF) when the motor load 28 is lower than the first power threshold Pth1 equal to or lower than the supply capacity of the FC 12, and to select the serial mode (SW1: OFF, SW2: ON) when the motor load 28 is higher than the first power threshold Pth1.

Thus, the fuel cell vehicle 10 according to this embodiment includes the serial/parallel switcher 16 and is configured to control, according to the magnitude of the motor load 28 including the motor 22 that generates the motive power for traction, the serial/parallel connection mode of the FC 12 and the battery 14 with respect to the motor load 28, and the operation status (set to boost or turned off) of the converter 18. Such a configuration enables the system efficiency to be reasonably improved. To be more detailed, under the condition where the motor load Pm can be covered by the supply capacity of the FC 12 (Pm<Pth1), the converter 18 is turned off so that the voltage conversion (boosting) is not performed, and the parallel mode is selected so as to drive the motor load 28 with the FC 12 alone (Vinv=Vfc).

Therefore, the storage SOC of the battery 14 is not decreased in the low load state (state II). In addition, since the converter 18 is turned off so that the voltage conversion (boosting) is not performed in the low load state (state II), the system efficiency is improved.

In contrast, under the condition where the supply capacity of the FC 12 is insufficient to cover the motor load Pm (Pm>Pth1), the FC 12 and the battery 14 are serially connected to thereby apply the serial voltage Vfc+Vbat as source voltage Vinv to the inverter 20 constituting the motor load 28. Such an arrangement prevents degradation of the drivability.

To simplify the above, the fuel cell vehicle 10 according to this embodiment drives the motor load 28 with the parallel voltage source including the voltage source that generates the voltage Vfc+Vbat boosted from the FC voltage Vfc by the converter 18 and the serial voltage source of the FC 12 and the battery 14 (Vfc+Vbat), in the high load state (state IV). In the low load state (state II), since the motor load 28 is driven by the FC 12 alone the storage SOC of the battery 14 is not decreased, and the system efficiency can be improved because the converter 18 is not turned on.

In this case, when the storage SOC of the battery 14 is equal to or higher than the storage threshold SOCth that enables the battery 14 to continue to supply power to the motor load 28 (SOC≥SOCth), the ECU 26 causes the serial/parallel switcher 16 to select the serial mode (SW1: OFF, SW2: ON) and turns off the converter 18 (SW3, SW4: OFF), and when the storage SOC of the battery 14 is lower than the storage threshold SOCth (SOC<SOCth), the ECU 26 causes the serial/parallel switcher 16 to select the serial mode (SW1: OFF, SW2: ON) and sets the converter 18 to boost the voltage (SW3, SW4: ON/OFF).

As described above, when the storage SOC corresponding to the remaining capacity of the battery 14 is sufficient the serial mode is selected and the converter 18 is turned off, and therefore the system efficiency can be further improved when the serial mode is selected. When the storage SOC is insufficient, the serial mode is selected and the converter 18 is set to boost the voltage to thereby cope with a larger motor load 28, and therefore the drivability can be secured.

When the motor load Pm is higher than the first power threshold Pth1 (Pm>Pth1) but lower than the second power threshold Pth2 that can be covered by the power from the FC 12 and the battery 14 (Pth2>Pm>Pth1), the ECU 26 causes the serial/parallel switcher 16 to select the serial mode (SW1: OFF, SW2: ON) and turns off the converter 18 (SW3, SW4: OFF).

With the mentioned arrangement, the converter 18 is turned off whenever possible despite the serial mode being selected, and therefore the system efficiency can be improved.

Variation 1

Although the decision of "NO at step S1" that the load is in the low state is made by the ECU 26 upon detecting that the motor load (power required by motor) Pm is lower than the first power threshold Pth1 (Pm<Pth1), the decision of "NO at step S1" may be made when an average value of the motor load Pm over a predetermined period (Pmmean; may also be a moving average over the predetermined period) falls below the first power threshold Pth1. Deciding the load state using the average Pmmean of the motor load Pm, in other words the average motor load, prevents occurrence of hunting of the control performance.

Here, from the viewpoint of preventing the occurrence of hunting of the control performance, the decision of "NO at step S1" may be made when a predetermined period of time has elapsed after the motor load Pm fell below the first power threshold Pth1 (Pm≤Pth1).

Variation 2

Although it is decided whether the storage SOC is larger than the storage threshold SOCth at step S4, the storage threshold SOCth may be lowered under predetermined conditions (conditions A, B, and C) cited below so as to facilitate the decision making at step S4. In this case, the serial connection mode and the OFF-state of the converter 18 become more likely to be selected at step S7, which may lead to further improved system efficiency.

Condition A: Lowering the storage threshold SOCth, the higher the vehicle speed Vs of the fuel cell vehicle 10 is. When the vehicle speed Vs is high, an increase in storage SOC of the battery 14 can be expected because of the collection (recharging) of the regenerative power when the vehicle speed Vs is slowed down, and therefore selecting the serial mode by the serial/parallel switcher 16 and turning off the converter 18 (step S7), regardless of the reduction in storage SOC, leads to improved system efficiency.

Condition B: Lowering the storage threshold SOCth, the higher the temperature of the battery 14 (battery temperature Tbat) is. When the temperature of the battery 14 (battery temperature Tbat) is high the charge/discharge efficiency of the battery 14 also becomes high, and therefore positively utilizing the battery 14 while keeping the converter 18 in the off state (step S7) leads to improved system efficiency.

Condition C: Lowering the storage threshold SOCth, the higher the outside temperature Ta is. When the outside temperature Ta is low, for example below freezing, residual gas in the anode flow path and/or the cathode flow path of the FC 12 is swept away by driving the air pump, when the vehicle is stopped. However, when the outside temperature Ta is high, the storage SOC may be lower by an amount corresponding to the consumption for the air pump, which is required when the outside temperature Ta is low, and therefore reducing the storage SOC incurs no inconvenience, and selecting the serial mode by the serial/parallel switcher 16 and turning off the converter 18 (step S7) when the outside temperature is high leads to improved system efficiency.

Variation 3

Figure 10:
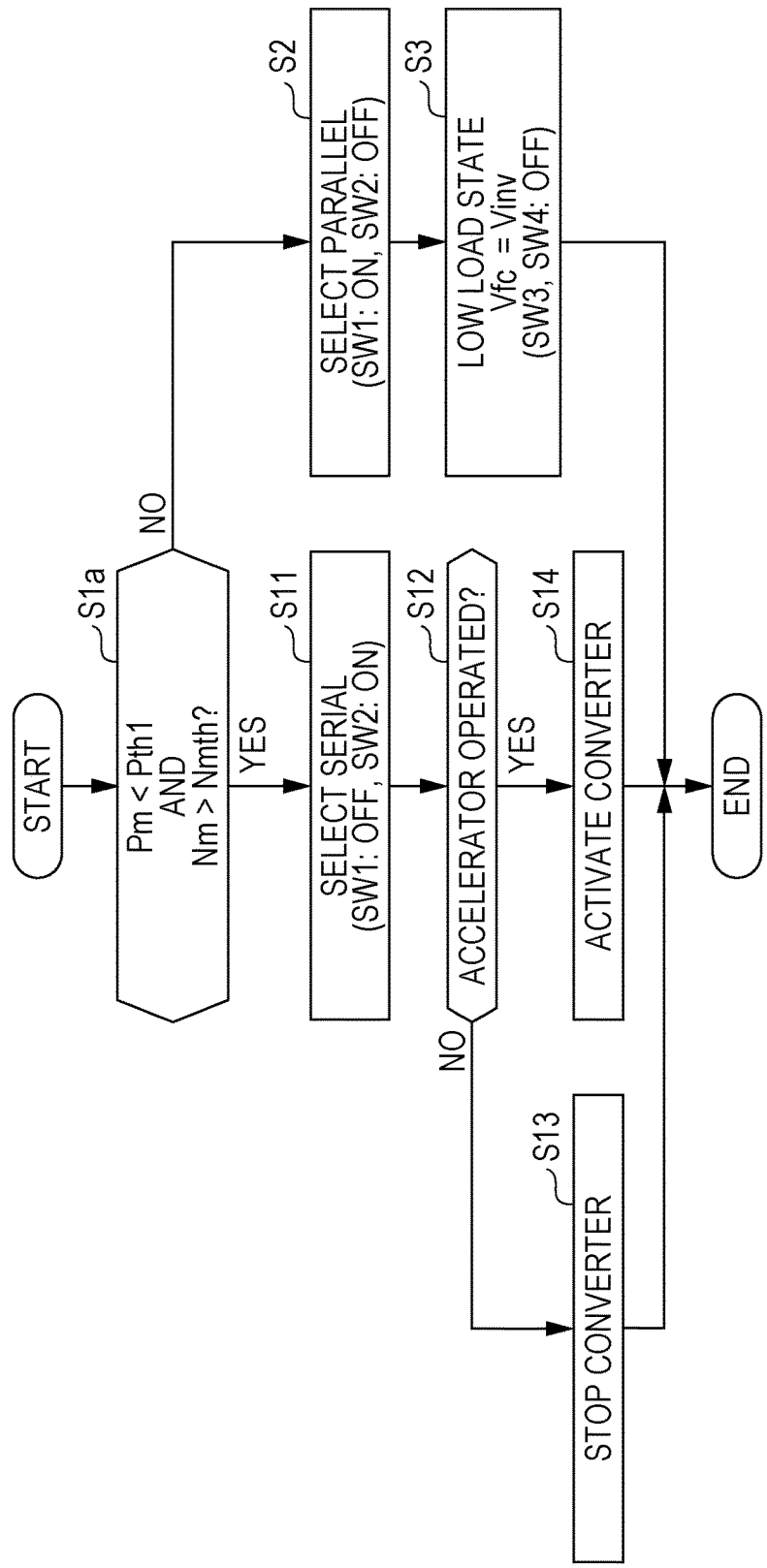
FIG. 10 is a flowchart for explaining an operation of a fuel cell vehicle according to a variation.

FIG. 10 is a flowchart for explaining the operation according to the variation 3. According to the flowchart of FIG. 9, when the motor load Pm is in the low load state such as a stable cruising phase (Pm Pth1, NO at step S1), the serial/parallel switcher 16 is always set to the parallel mode (step S2), so as to control the FC 12 according to the motor load Pm, in the low load state (state II) (step S3).

According to the flowchart of FIG. 10 representing the variation 3, in contrast, even when the motor load Pm is in the low load state such as a stable cruising phase (Pm Pth1), a detected motor rotation speed Nm and a rotation speed threshold Nmth are further compared at step S1a, and when the motor rotation speed Nm is higher than the rotation speed threshold Nmth (YES at step S1a) it is decided that the vehicle is in the (YES at step S1a), and the serial/parallel switcher 16 is set to the serial mode at step S11.

Then the ECU 26 further decides at step S12 whether an accelerating operation is being made, and in the case where the accelerating operation is not being performed (step S12: NO), the ECU 26 keeps the converter 18 in the OFF-state at step S13 and continues with the operation (in this case, in the sequence of step S13, YES at step S1a, NO at step S12, and step S13). In the case where the accelerating operation is performed during the mentioned sequence (YES at step S12), the fuel cell vehicle 10 can be immediately shifted to the high-speed acceleration phase (see FIG. 7) in response to the accelerating operation, by activating the converter 18 at step S14, since the serial mode (Vinv=Vfc+Vbat) has already been maintained (see FIG. 6).

Variation 4

Figure 11:
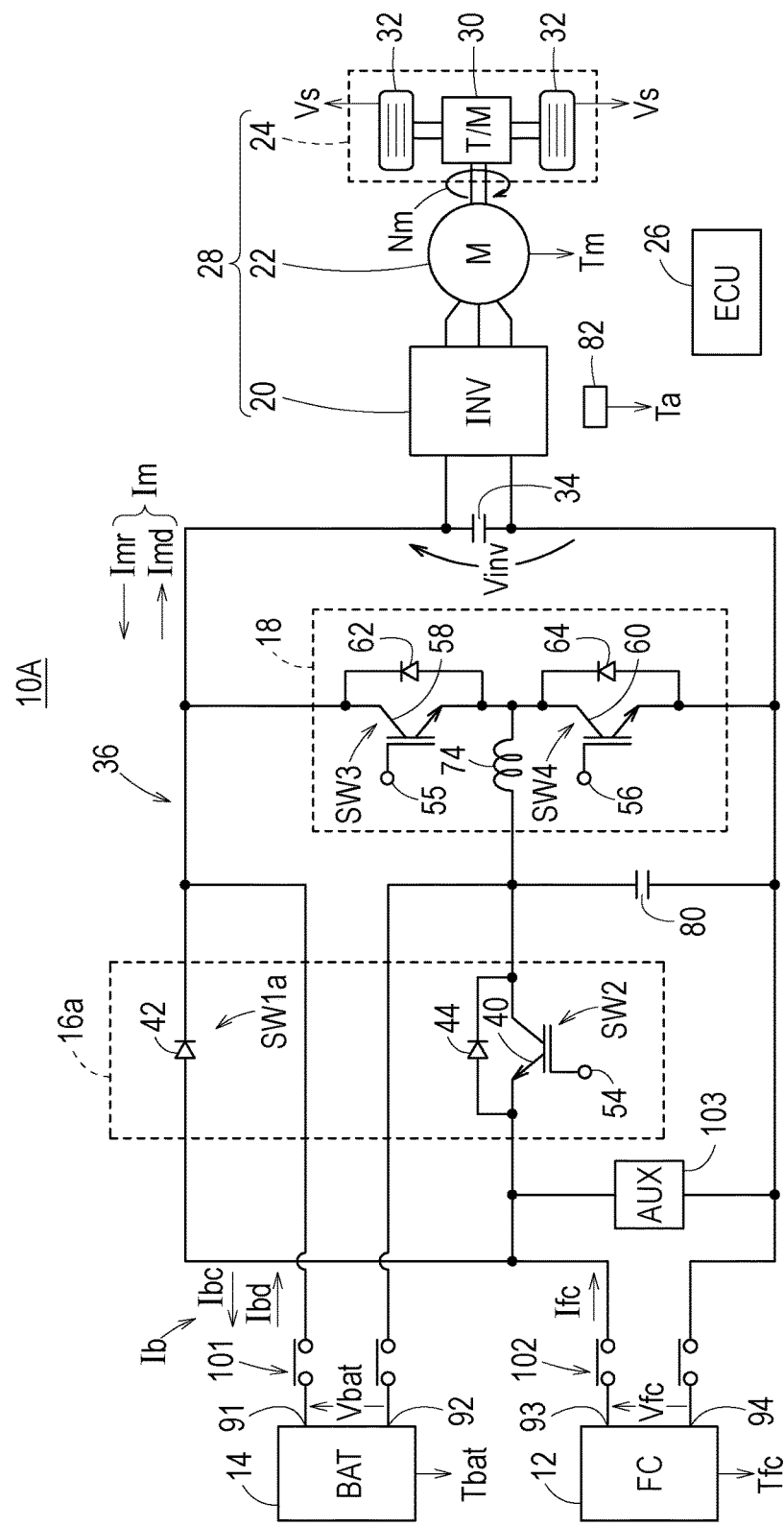
FIG. 11 is a schematic diagram showing an overall configuration of a fuel cell vehicle according to another variation.

Further, the present disclosure is not only applicable to the fuel cell vehicle 10 shown in FIG. 1, but also to fuel cell vehicles having different configurations according to the description of this application. For example, the switching element SW1 may be substituted with a switching element SW1a solely constituted of the diode 42, as in a fuel cell vehicle 10A shown in FIG. 11.

In this case, when the switching element SW2 is set to the OFF-state the diode 42 becomes conductive and hence the switching element SW1a is set to the ON-state, and the serial/parallel switcher 16a is set to the parallel mode so that the power source unit 36 is constituted exclusively of the FC 12 (Vinv=Vfc). In contrast, when the switching element SW2 is set to the ON-state the diode 42 is disconnected and hence the switching element SW1a is set to the OFF-state, and the serial/parallel switcher 16a is set to the serial mode, and thus the power source unit 36 in which the FC 12 and the battery 14 are serially connected to each other (Vinv=Vfc+Vbat) can be attained.

In an aspect, the present disclosure provides a fuel cell vehicle including a motor load including a motor that generates motive power for traction, a fuel cell, and a power storage device. The fuel cell vehicle includes a serial/parallel switcher that switches a connection mode of the fuel cell and the power storage device with respect to the motor load between a serial mode and a parallel mode with the fuel cell alone, a converter to be turned off when either the serial mode or the parallel mode is selected, or to be caused to boost a fuel cell voltage when the serial mode is selected and to apply the boosted voltage to the motor load, and a control unit that controls the serial/parallel switcher and the converter. The control unit causes the serial/parallel switcher to select the parallel mode when the motor load is lower than a first power threshold equal to or lower than a supply capacity of the fuel cell, and to select the serial mode when the motor load is higher than the first power threshold.

The fuel cell vehicle according to the present disclosure, which includes the fuel cell and the power storage device connectable to each other, and also the converter, includes the serial/parallel switcher and is configured to control, according to the magnitude of the motor load including the motor that generates the motive power for traction, the serial/parallel connection mode of the fuel cell and the power storage device with respect to the motor load, and the operation status of the converter. Such a configuration enables the system efficiency to be reasonably improved.

To be more detailed, under a condition where the motor load can be covered by the supply capacity of the fuel cell (motor load<first power threshold), the converter is turned off so that the voltage conversion (boosting) is not performed, and the parallel mode is selected. Thus, the motor load is driven by the fuel cell alone. In this case, since the motor load is driven by the fuel cell alone, the state of charge (SOC) of the power storage device is not decreased. In addition, since the converter is turned off so that the voltage conversion (boosting) is not performed, the system efficiency is improved.

In contrast, under a condition where the supply capacity of the fuel cell is insufficient to cover the motor load (motor load>first power threshold), the fuel cell and the power storage device are serially connected to thereby apply the serial voltage to the motor load. Such an arrangement prevents degradation of the drivability.

In this case, when the remaining capacity of the power storage device is equal to or higher than a storage threshold that enables the power storage device to continue to supply power to the load, the control unit may cause the serial/parallel switcher to select the serial mode and turn off the converter, and when the remaining capacity of the power storage device is lower than the storage threshold, the control unit may cause the serial/parallel switcher to select the serial mode and set the converter to boost the voltage.

As described above, when the remaining capacity of the power storage device is sufficient the serial mode is selected and the converter is turned off, and therefore the system efficiency can be further improved when the serial mode is selected. When the remaining capacity of the power storage device is insufficient, the serial mode is selected and the converter is set to boost the voltage to thereby cope with a larger motor load, and therefore the drivability can be secured.

When the motor load is higher than the first power threshold but lower than a second power threshold that can be covered by the power from the fuel cell and the power storage device, the control unit may cause the serial/parallel switcher to select the serial mode and turn off the converter.

With the mentioned arrangement, the converter is turned off whenever possible despite the serial mode being selected, and therefore the system efficiency can be improved.

The storage threshold may be lowered according to an increase in vehicle speed of the fuel cell vehicle. When the vehicle speed is high, an increase in remaining capacity of the power storage device can be expected because of collection of regenerative power, and therefore selecting the serial mode and turning off the converter, regardless of the reduction in remaining capacity, leads to improved system efficiency.

Further, the storage threshold may be lowered according to an increase in temperature of the power storage device. When the temperature of the power storage device is high the charge/discharge efficiency of the power storage device also becomes high, and therefore positively utilizing the power storage device while keeping the converter in the off state leads to improved system efficiency.

Further, the storage threshold may be lowered according to an increase in outside temperature. When the outside temperature is low, residual gas in an anode flow path and/or cathode flow path of the fuel cell is swept away by driving an air pump, when the vehicle is stopped. However, when the outside temperature is high, the remaining capacity of the power storage device may be lower by an amount corresponding to the consumption for the air pump, which is required when the outside temperature is low, and therefore reducing the remaining capacity incurs no inconvenience, and selecting the serial mode and turning off the converter when the outside temperature is high leads to improved system efficiency.

Still further, when the motor load is lower than the first power threshold, the control unit may detect the rotation speed of the motor before causing the serial/parallel switcher to select the parallel mode, and cause the serial/parallel switcher to select the parallel mode when the rotation speed is lower than a rotation speed threshold, and cause the serial/parallel switcher to select the serial mode instead of the parallel mode, when the rotation speed is equal to or higher than the rotation speed threshold.

Although the motor load is small, when the rotation speed of the motor is high the output for reacceleration can sharply rise, and therefore selecting the serial mode so as to secure the required voltage prevents degradation of the drivability.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle including a motor load including a motor that generates motive power for traction, a fuel cell, and a power storage device, the fuel cell vehicle comprising:
   a serial/parallel switcher that switches a connection mode of the fuel cell and the power storage device with respect to the motor load between a serial mode and a parallel mode with the fuel cell alone;
   a converter operable in a first state to be turned off when either the serial mode or the parallel mode is selected, or operable in a second state to be caused to boost a fuel cell voltage when the serial mode is selected and to apply the boosted voltage to the motor load; and
   a control unit that controls the serial/parallel switcher and the converter,
   wherein the control unit causes the serial/parallel switcher to select the parallel mode when the motor load is lower than a first power threshold equal to or lower than a supply capacity of the fuel cell, and to select the serial mode when the motor load is higher than the first power threshold.

2. The fuel cell vehicle according to claim 1, wherein, when the remaining capacity of the power storage device is equal to or higher than a storage threshold that enables the power storage device to continue to supply power to the load, the control unit causes the serial/parallel switcher to select the serial mode and turns off the converter, and when the remaining capacity of the power storage device is lower than the storage threshold, the control unit causes the serial/parallel switcher to select the serial mode, and the converter to boost the voltage.

3. The fuel cell vehicle according to claim 1, wherein, when the motor load is higher than the first power threshold but lower than a second power threshold that can be covered by the power from the fuel cell and the power storage device, the control unit causes the serial/parallel switcher to select the serial mode and turns off the converter.

4. The fuel cell vehicle according to claim 2, wherein the storage threshold is lowered according to an increase in vehicle speed of the fuel cell vehicle.

5. The fuel cell vehicle according to claim 2, wherein the storage threshold is lowered according to an increase in temperature of the power storage device.

6. The fuel cell vehicle according to claim 2, wherein the storage threshold is lowered according to an increase in outside temperature.

7. The fuel cell vehicle according to claim 1, wherein, when the motor load is lower than the first power threshold, the control unit further detects a rotation speed of the motor before causing the serial/parallel switcher to select the parallel mode, and causes the serial/parallel switcher to select the parallel mode when the rotation speed is lower than a rotation speed threshold, and causes the serial/parallel switcher to select the serial mode instead of the parallel mode, when the rotation speed is equal to or higher than the rotation speed threshold.

8. A fuel cell vehicle comprising:
   a travelling apparatus including a motor to generate power to move the fuel cell vehicle;
   a fuel cell;
   a power storage device;
   a switch to switch a connection mode between a serial mode and a parallel mode, the fuel cell and the power storage device being connected in series and connected to the travelling apparatus in parallel in the serial mode, the fuel cell being connected to the travelling apparatus in parallel in the parallel mode;
   a converter connected to the travelling apparatus in parallel to be turned on to boost a voltage generated by the fuel cell to be applied to the travelling apparatus and to be turned off not to boost the voltage generated by the fuel cell to be applied to the travelling apparatus when the parallel mode is selected; and
   a controller to turn on or turn off the converter, the controller being to control the switch to switch the connection mode to the parallel mode when power to be consumed by the travelling apparatus is lower than a first power threshold which is equal to or lower than a supply capacity of the fuel cell, and to switch the connection mode to the serial mode when the power to be consumed by the travelling apparatus is higher than the first power threshold.

9. The fuel cell vehicle according to claim 8, wherein, when the remaining capacity of the power storage device is equal to or higher than a storage threshold that enables the power storage device to continue to supply power to the travelling apparatus, the controller controls the switch to switch the connection mode to the serial mode to turn off the converter, and when the remaining capacity of the power storage device is lower than the storage threshold, the controller controls the switch to switch the connection mode to the serial mode to turn on the converter.

10. The fuel cell vehicle according to claim 8,
wherein, when the power to be consumed by the travelling apparatus is higher than the first power threshold but lower than a second power threshold that can be covered by the power from the fuel cell and the power storage device, the controller controls the switch to switch the connection mode to the serial mode to turn off the converter.

11. The fuel cell vehicle according to claim 9,
wherein the storage threshold is lowered according to an increase in vehicle speed of the fuel cell vehicle.

12. The fuel cell vehicle according to claim 9,
wherein the storage threshold is lowered according to an increase in temperature of the power storage device.

13. The fuel cell vehicle according to claim 9,
wherein the storage threshold is lowered according to an increase in outside temperature.

14. The fuel cell vehicle according to claim 8,
wherein, when the power to be consumed by the travelling apparatus is lower than the first power threshold, the controller further detects a rotation speed of the motor before controlling the switch to switch the connection mode to the parallel mode, and controls the switch to switch the connection mode to the parallel mode when the rotation speed is lower than a rotation speed threshold, and controls the switch to switch the connection mode to the serial mode instead of the parallel mode, when the rotation speed is equal to or higher than the rotation speed threshold.

15. A fuel cell vehicle including a motor load including a motor, a fuel cell, and a power storage device, the fuel cell vehicle comprising:
a serial/parallel switcher configured to switch a connection mode of the fuel cell and the power storage device with respect to the motor load between a serial mode and a parallel mode with the fuel cell alone;
a converter configured to be turned off when either the serial mode or the parallel mode is selected, or configured to boost a fuel cell voltage when the serial mode is selected and to apply the boosted voltage to the motor load; and
a control unit configured to control the serial/parallel switcher and the converter,
wherein the control unit is configured to cause the serial/parallel switcher to select the parallel mode when the motor load is lower than a first power threshold equal to or lower than a supply capacity of the fuel cell, and configured to select the serial mode when the motor load is higher than the first power threshold.

16. The fuel cell vehicle according to claim 15,
wherein, when the remaining capacity of the power storage device is equal to or higher than a storage threshold that enables the power storage device to continue to supply power to the load, the control unit is configured to cause the serial/parallel switcher to select the serial mode and turns off the converter, and when the remaining capacity of the power storage device is lower than the storage threshold, the control unit is configured to cause the serial/parallel switcher to select the serial mode, and the converter to boost the voltage.

17. The fuel cell vehicle according to claim 15,
wherein, when the motor load is higher than the first power threshold but lower than a second power threshold that can be covered by the power from the fuel cell and the power storage device, the control unit is configured to cause the serial/parallel switcher to select the serial mode and turns off the converter.

18. The fuel cell vehicle according to claim 15,
wherein, when the motor load is lower than the first power threshold, the control unit is configured to further detect a rotation speed of the motor before causing the serial/parallel switcher to select the parallel mode, and is configured to cause the serial/parallel switcher to select the parallel mode when the rotation speed is lower than a rotation speed threshold, and is configured to cause the serial/parallel switcher to select the serial mode instead of the parallel mode, when the rotation speed is equal to or higher than the rotation speed threshold.

19. The fuel cell vehicle according to claim 16,
wherein the storage threshold is lowered according to an increase in vehicle speed of the fuel cell vehicle.

20. The fuel cell vehicle according to claim 16,
wherein the control unit is configured to lower the storage threshold according to an increase in temperature of the power storage device.

21. The fuel cell vehicle according to claim 16,
wherein the control unit is configured to lower the storage threshold according to an increase in outside temperature.

* * * * *